Sept. 27, 1932.   O. E. ROSEMAN   1,880,107
FITTING AND REDUCER ADAPTER THEREFOR
Filed May 28, 1931
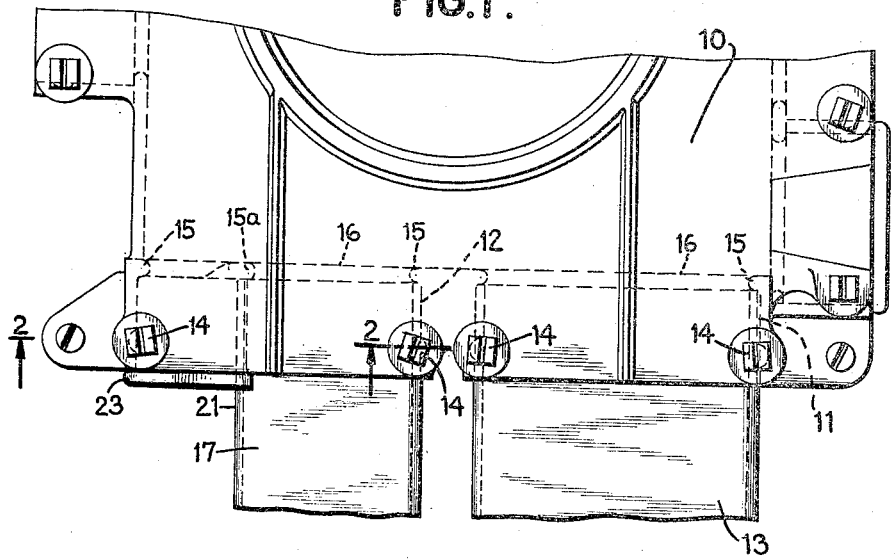
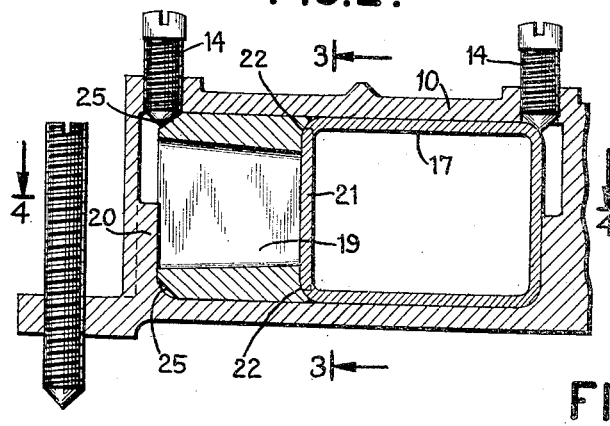
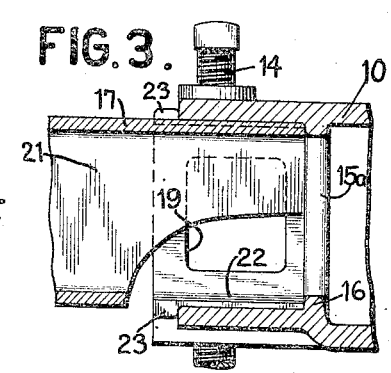
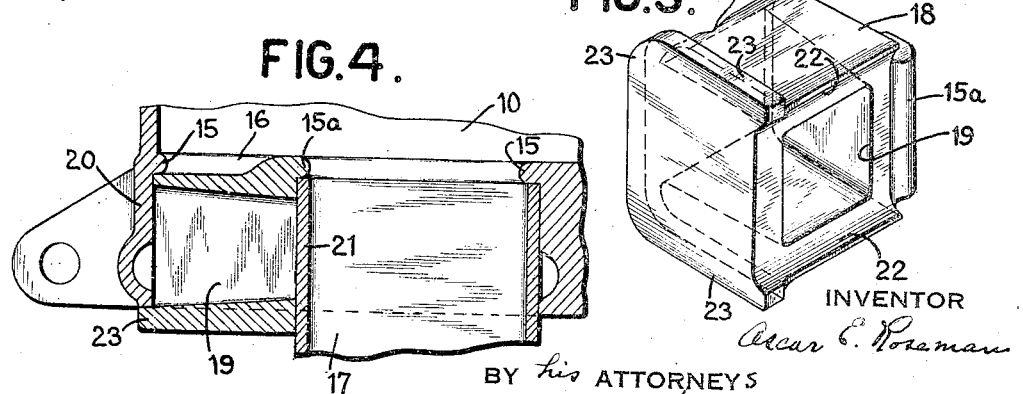
INVENTOR
Oscar E. Roseman
BY his ATTORNEYS
Cooper, Kerr & Dunham Patented Sept. 27, 1932

1,880,107

UNITED STATES PATENT OFFICE

OSCAR E. ROSEMAN, OF PITTSBURGH, PENNSYLVANIA, ASSIGNOR TO NATIONAL ELECTRIC PRODUCTS CORPORATION, OF NEW YORK, N. Y., A CORPORATION OF DELAWARE

FITTING AND REDUCER ADAPTER THEREFOR

Application filed May 28, 1931. Serial No. 540,639.

In electric wiring systems where underfloor ducts were employed, it is customary to employ boxes and fittings of different sorts. Frequently it is necessary to employ ducts of different sizes and in certain cases it has been the practice to provide special boxes or fittings in which different sized parts or openings are provided for each size of duct. This practice has necessitated the stocking of a multiplicity of fittings or boxes with the proper size openings for the different duct sizes. In order to obviate such practice adapters have been provided. Such adapters comprised a male end fitting which fitted into the large size opening in a box and the adapter also had a female end thereon adapted to receive a smaller sized duct. The use of such adapter was quite satisfactory except that it necessitated stopping the end of the small duct a certain distance, say an inch and a quarter outside of the point where the large duct fitted within the duct opening in the box. This necessitated placing of instructions on the adapter to cut off the duct a certain distance, say an inch and a quarter from the end thereof. The duct had to be cut off because if it were not cut off the relative positions of the duct outlets in the duct would be displaced lengthwise to the amount of the extra distance taken up by the adapter. In practical installations it was found that workmen doing the installing were frequently disregarding the requirement to cut off the length from the end of the duct with the result that there was a subsequent necessity of re-installing the ducts when such omissions were discovered. While such corrections can be made before the duct is buried in concrete, these corrections could not be made if the duct had already been buried in concrete. In that event resort had to be made to special plates for the service fittings because the duct outlets came too close together to accommodate standard flanges. All of these factors have detracted from the use of the adapters which have been heretofore provided.

The present invention has for its object the provision of a construction which will obviate the difficulties heretofore encountered in the use of adapters.

One object of the present invention resides in the provision of an adapter which will obviate the necessity of cutting off a duct and in lieu thereof provide facilities for bushing the end of the duct on the inside end of the block or adapter fitting and furthermore to provide means for preventing the block from being carried too far into the inside of the box or fitting.

A further object of the present invention resides in the provision of an adapter block adapted to be locked into proper position by engagement with suitable set screws carried by the box or fitting.

Further objects of the present invention reside in the provision of a filler adapter for underfloor duct systems which is adapted to avoid the necessity of cutting ducts and which is cheaper than previous adapters and more easily manufactured.

A further object of the present invention resides in the provision of an adapter which is adapted to obviate the danger of duct outlets in the duct being placed in improper relative positions to one another.

A further object of the present invention resides in the provision of a construction which will provide a direct connection between the duct and box even though a small size duct is employed so that greater rigidity, proper alignment and direct opening between the duct and box for grounding purposes is secured in place of the two indirect connections which are necessary with ordinary reducing adapters as heretofore used.

A further object is to provide a reducing adapter which will properly bush the side of the duct against which the reducer bears.

A further object of the present invention is to provide a reducer in which the screw securing means in the duct receiving fitting will not only lock the reducer in place but which will tend to pull the reducer back into the duct receiving opening of the fitting.

A further object of the present invention is to provide a reducer which will effectually blank off the unused portion of the duct receiving opening of the fitting.

In the drawing:

Figure 1 is a fragmentary view of an underfloor box showing the novel adapter in use. In this figure two ducts are also shown, one of large size and one of small size;

Fig. 2 is a detail sectional view taken substantially on line 2—2 of Fig. 1;

Fig. 3 is a detail sectional view taken substantially on line 3—3 of Fig. 2;

Fig. 4 is a transverse sectional view taken on line 4—4 of Fig. 2; and

Fig. 5 is an isometric view of the adapter block.

In more detail in the Fig. 1, 10 designates an underfloor box or fitting having a pair of female coupling portions designated as 11 and 12. The socket 11 is adapted to receive a relatively large size duct 13. This duct is secured in position in the underfloor box by means of set screws 14 which cooperate with the duct and fitting. Such securing means are fully described in United States Letters Patent of James M. G. Fullman, No. 1,782,779, dated November 25, 1930. The sockets 11 and 12 at their inner ends are provided with shoulder portions 15 and 16. Shoulders 15 are arranged to abut the lateral edges of the duct 13 and shoulders 16 abut the marginal top and bottom edges of the duct. Similar shoulders are provided for the socket or recess 12 and these shoulders bear similar reference characters. 17 designates a small size duct which is intended to be fitted into the socket 12.

The novel reducer will now be described. This reducer comprises a hollow block generally designated 18 in Fig. 5. Such reducer is interiorly hollowed out as shown at 19 to provide for lightness. It may be conveniently made of a casting. The reducer block is of proper lateral dimensions to snugly fit between the side wall 20 of the box or fitting and the side wall 21 of the duct 17 as best shown in Fig. 2. The reducer block at the side which bears against the wall 21, is slightly curved as indicated at 22 to conform to the curvature of the corner portions of the duct. The block 18, at the inner terminating edge, is provided with a shoulder portion 15a (see Fig. 4), which is disposed in alignment with the shoulders 15—15 of the fitting when the reducer is inserted so as to bear against the left shoulder 15 and the bottom and top shoulder 16. The reducer block is also provided with exterior shouldered portions 23 adapted to bear against the outer face of the box 10 when the reducer is in position. The corners of the reducer block remote from the wall 21 of duct 17 are curved or sloped as indicated at 25 so as to be adapted to be clamped by advancing the left hand set screw 14 (see Fig. 2).

The manner of use of the reducer will be readily understood. The reducer or filler block is first placed at the end of duct 17 with the shoulder 15a of the filler block extending over the end of the lateral edge of the duct. Duct 17 and the reducer or filler block is then introduced into the socket of the box or fitting 10 and the ends of the duct caused to abut against the upper and bottom shoulders 16 and against the right hand shoulder 15. The reducer block fits in place to the left of the duct 17 snugly fitting between the wall 20 of the fitting and the wall 21 of the duct. Thereafter set screws 14 are tightened down. The tightening of these set screws crowds the filler block and duct together and also clamps both the duct and filler block in and to the fitting. It will be understood that the filler block is secured against inward displacement both by the shoulders 15 and 16 of the fitting and by the shoulders 23.

It will be understood that with the foregoing construction the necessity of cutting duct 17 is obviated. This will be clear from Fig. 1 which shows the inner end of duct 17 in alignment with the inner end of duct 13.

I claim:

1. A reducer for the socket of a fitting comprising a filler block shaped to fit the space in the socket to one side of a duct of relatively smaller lateral dimension when said duct is introduced into said socket, said filler block including a flange portion which is adapted to project over and bush the lateral end of the duct which is adjacent the filler block.

2. A reducer for the socket of a fitting comprising a filler block shaped to fit the space in the socket to one side of a duct of relatively smaller lateral dimension when said duct is introduced into said socket, said filler block having a sloping portion thereon adapted for clamping cooperation with a clamping set screw for clamping the filler block in position in the socket of a fitting.

3. A reducer for use when a relatively narrow duct is to be introduced into a relatively wider socket in a fitting, said fitting having a set screw adapted for cooperation with the radiused corner of the smaller sized duct, said reducer comprising a metal block adapted to fill the excess space between one side of the smaller sized duct and fitting, said block further acting to provide for clamping action upon advancing of a set screw into cooperation with the radiused corner of the small duct.

4. A fitting provided with a socket adapted to receive a duct of a certain dimension and with a set screw adapted for clamping cooperation with the radiused corner of a duct introduced into said socket, a filler block adapted for disposition in said fitting in the unoccupied space when a duct of similar height but narrower lateral dimension is introduced into the socket which is adapted to receive a wider duct, said filler block being shaped so as to be itself securely clamped and the narrower duct also clamped when the set screw is advanced into cooperation with the duct.

5. A fitting assemblage according to claim 3 with another set screw carried by the fitting and a sloping portion upon the corner of the filler block for cooperation with said set screw, said set screws upon being advanced acting to crowd the filler block against the duct and to clamp both the filler block and the duct to the fitting.

In testimony whereof I hereto affix my signature.

OSCAR E. ROSEMAN.